(12) United States Patent
Khemani et al.

(10) Patent No.: US 11,008,442 B2
(45) Date of Patent: *May 18, 2021

(54) STARCH NANOCOMPOSITE MATERIALS

(71) Applicant: Plantic Technologies Ltd., Altona (AU)

(72) Inventors: Kishan Khemani, Williamstown (AU); Graeme Moad, Sassafras (AU); Edmond Lascaris, Bundoora (AU); Guoxin Li, Keysborough (AU); George Simon, Carnegie (AU); Jana Habsuda, Knoxfield (AU); Robert Shanks, Glen Iris (AU); Antonietta Genovese, Sandringham (AU); Wasantha Gunaratne, Macleod (AU); Lance Nichols, St. Albans Park (AU)

(73) Assignee: PLANTIC TECHNOLOGIES LTD., Altona (AU)

( * ) Notice: Subject to any disclaimer, the term of this patent is extended or adjusted under 35 U.S.C. 154(b) by 61 days.

This patent is subject to a terminal disclaimer.

(21) Appl. No.: 15/629,073

(22) Filed: Jun. 21, 2017

(65) Prior Publication Data

US 2017/0283579 A1 Oct. 5, 2017

Related U.S. Application Data

(63) Continuation of application No. 12/602,257, filed as application No. PCT/US2008/000787 on Jun. 2, 2008, now Pat. No. 9,745,453.

(30) Foreign Application Priority Data

Jun. 1, 2007 (AU) ............... 2007902980

(51) Int. Cl.
*C08L 3/12* (2006.01)
*C08L 3/02* (2006.01)
(Continued)

(52) U.S. Cl.
CPC ............ *C08L 3/02* (2013.01); *B29B 7/007* (2013.01); *B29B 7/46* (2013.01); *B29B 7/728* (2013.01);
(Continued)

(58) Field of Classification Search
None
See application file for complete search history.

(56) References Cited

U.S. PATENT DOCUMENTS 3,904,601 A 9/1975 Tessler et al.
4,863,655 A * 9/1989 Lacourse ............... C08B 30/20
264/53
(Continued)

FOREIGN PATENT DOCUMENTS

EP 1134258 A1 9/2001
WO 2005030279 A1 4/2005
(Continued)

OTHER PUBLICATIONS

Xu et al, melt-intercalated starch acetate nanocomposite foams as affected by type of organoclay, American Assoc. of Cereal Chemists, vol. 82, No. 1, pp. 105-110 (Year: 2005).*

(Continued)

*Primary Examiner* — Stefanie J Cohen
(74) *Attorney, Agent, or Firm* — Kilyk & Bowersox, P.L.L.C.

(57) ABSTRACT

In one aspect, the invention provides a substantially exfoliated nanocomposite material including starch and hydrophobically modified layered silicate clay. In another aspect, the invention provides packaging made from material including the substantially exfoliated nanocomposite material described above. The nanocomposite material has improved mechanical and rheological properties and reduced sensitivity to moisture in that the rates of moisture (Continued)

update and/or loss are reduced. In another aspect, the invention provides a process for preparing the substantially exfoliated nanocomposite material described above, including a step of mixing the starch in the form of an aqueous gel with the hydrophobic clay in a melt mixing device. In a further aspect, the invention provides a process for preparing the substantially exfoliated nanocomposite material, including the steps of mixing the starch with the hydrophobic clay to form a masterbatch (hereinafter "the masterbatch process") and mixing the masterbatch with further starch.

12 Claims, 14 Drawing Sheets

(51) Int. Cl.
| | | |
|---|---|---|
| *C08K 9/04* | | (2006.01) |
| *B29B 7/00* | | (2006.01) |
| *B29B 7/46* | | (2006.01) |
| *B29B 7/82* | | (2006.01) |
| *B29C 48/40* | | (2019.01) |
| *B29B 7/72* | | (2006.01) |
| *C08K 3/34* | | (2006.01) |

(52) U.S. Cl.
CPC ............. *B29B 7/823* (2013.01); *B29B 7/826* (2013.01); *B29C 48/40* (2019.02); *C08K 9/04* (2013.01); *C08K 3/346* (2013.01)

(56) References Cited

U.S. PATENT DOCUMENTS

| | | | | |
|---|---|---|---|---|
| 5,462,983 | A * | 10/1995 | Bloembergen | ............ C08L 3/06 523/128 |
| 6,261,640 | B1 | 6/2001 | Pinnavaia et al. | |
| 6,521,690 | B1 | 2/2003 | Ross et al. | |
| 6,730,724 | B1 * | 5/2004 | Bastioli | ............ C08L 1/12 524/47 |
| 6,811,599 | B2 * | 11/2004 | Fischer | ............ C08K 3/346 106/157.71 |
| 7,094,817 | B2 | 8/2006 | Halley et al. | |
| 7,211,613 | B2 | 5/2007 | Lorah et al. | |
| 2002/0165305 | A1 | 11/2002 | Knudson, Jr. et al. | |
| 2002/0169246 | A1 | 11/2002 | Barbee et al. | |
| 2006/0246272 | A1 * | 11/2006 | Zhang | ............ B32B 5/18 428/304.4 |
| 2010/0307951 | A1 | 12/2010 | Khemani et al. | |

FOREIGN PATENT DOCUMENTS

| | | | |
|---|---|---|---|
| WO | WO-2005068364 A1 * | 7/2005 | ............. C01B 33/44 |
| WO | 2006055505 A2 | 5/2006 | |

OTHER PUBLICATIONS

Park et al, Preparation and properties of biodegradable thermoplastic starch/clay hybrids, Macromol. Mater. Eng., 287, 553-558 (Year: 2002).*

Halsall et al., "The Amylase Content of the Starch Present in the Growing Potato Tuber," Biochemical Journal, vol. 43, 1948, pp. 70-72.

Kornmann, X., "Synthesis and Characterisation of Thermoset-Clay Nanocomposites," Division of Polymer Engineering, Lulea University of Technology, 1999, pp. 1-29.

"Understanding Starch Functionality," Food Product Design, Jan. 1996, 5 pages.

Wang et al., "Biopolymer chitosan/montmorillonite nanocomposites: Preparation and characterization," Polymer Degradation and Stability, vol. 90, 2005, pp. 123-131.

Xie et al., "Starch Modification and Applications," Food Carbohydrates, Chemistry, Physical Properties and Applications, Chapter 8, Section 8.2.4.1, Taylor & Francis Group, LLC, 2005, 3 pages.

Office Action received in corresponding Japanese Patent Application No. 2013-207592 dated May 14, 2015 (3 pages).

Kalambur et al., "Starch-based nanocomposites by reactive extrusion processing," Polymer International, 53 (2004), 1413-1416.

Kampeerapappun et al., "Preparation of cassava starch/ montmorillonite composite film," Carbohydrate Polymers 67 (2007), 155-163.

Chiou et al., "Rheology of starch-clay nanocomposites," Carbohydrate Polymers 59 (2005), 467-475.

Supplementary European Search Report issued in corresponding European Patent Application No. 08756876 dated Oct. 19, 2010 (3 pages).

International Search Report issued in corresponding International Patent Application No. PCT/AU2008/000787 dated Jul. 8, 2008 (2 pages).

International Preliminary Report on Patentability issued in corresponding International Patent Application No. PCT/AU2008/ 000787 dated Jul. 15, 2009 (4 pages).

Rose, E., "Clay Nanocomposites in Biodegradable Starch Plastics," (retrieved on Jan. 14, 2008), retrieved from URL:www.cheque.uq. edu.au/ugrad/theses/2001/Pdf/E.Rose.pdf, 57 pages.

* cited by examiner

WAXS of R1s (A and B), C = 1% and D = 2% CLOISITE™ 20A nanocomposites, curves offset by 500 units.

WAXS of A = 3% (concrete mixer), B = 3% (feeder) and C = 5% CLOISITE™ 20A nanocomposites, curves offset by 500 units.

Derivative mass curves for R1 and CLOISITE™ 20A nanocomposites, R1s (A and B), C = 1% and D = 2% CLOISITE™ 20A nanocomposites, curves offset by 12 units.

Derivative mass curves for R1 and CLOISITE™ 20A nanocomposites, A = 3% (concrete mixer), B = 3% (feeder) and C = 5% CLOISITE™ 20A nanocomposites, curves offset by 12 units.

STARCH NANOCOMPOSITE MATERIALS

This application is a continuation of U.S. patent application Ser. No. 12/602,257, filed Nov. 30, 2009, which is a National Stage Application of PCT/AU2008/000787, filed Jun. 2, 2008, which in turn claims priority to Australian Patent Application No. 2007902980, filed Jun. 1, 2007.

FIELD OF THE INVENTION

The present invention relates generally to nanocomposite materials. More particularly, the invention relates to nanocomposite materials which include starch and a substantially exfoliated hydrophobic clay. The invention also relates to a process for preparing such nanocomposite materials.

In one particular aspect, the invention relates to a nanocomposite material suitable for use in packaging materials and it will be convenient hereinafter to describe the invention in relation to that application. It should be appreciated, however, that the present invention is not limited to that application only, and may be applied to other applications.

BACKGROUND OF THE INVENTION

The following discussion is intended to facilitate an understanding of the present invention. However, it should be appreciated that the discussion is not an acknowledgement or admission that any of the matter referred to was published, known or part of the knowledge of the skilled worker at the priority date of the application.

Thermoplastic materials are typically prepared from hydrocarbon raw materials. Due to environmental problems associated with their production and degradation, alternative materials have been developed.

One alternative is to use a natural polymer such as starch to make thermoplastic materials. Natural polymers originate from renewable sources and are intrinsically biodegradable.

Nanocomposites made from unmodified low amylose starch and unmodified or hydrophilic clays have been disclosed.

U.S. Pat. No. 6,811,599 discloses a biodegradable thermoplastic material comprising a natural polymer, a plasticiser and an exfoliated clay having a layered structure. The description refers to a need to choose an organic modificant of the clay for compatibility with the natural polymer. This suggests that a hydrophilic clay is desirable. A problem with the material is that only partial exfoliation was obtained.

A paper by H Park et al, entitled "Preparation and properties of biodegradable thermoplastic starch/clay hybrids" in *Macromolecular Materials and Engineering* 2002, 287, (8), 553-558, discloses starch-based nanocomposites based on both sodium montmorillonite unmodified clay (CLOISITE™ Na+) and organic modified clays (CLOISITE™ 6A, 10A, and 30B). The most desirable mechanical properties were obtained with the unmodified clay and little exfoliation or expansion of the clay structure was observed.

A paper by B Q Chen and J R G Evans, entitled "Thermoplastic starch-clay nanocomposites and their characteristics" in *Carbohydrate Polymers* 2005, 61, (4), 455-463, discloses nanocomposites based on glycerol-plasticised thermoplastic starch. The clays used were sodium montmorillonite, sodium hectorite, sodium hectorite modified with dimethyl di(hydrogenated tallow) ammonium chloride and kaolinite. Samples were prepared by melt processing using a two-roll mill. Only the unmodified montmorillonite and hectorite clays, both of which are hydrophilic, were reported to give partial exfoliation.

A paper by K Bagdi et al, entitled "Thermoplastic starch/layered silicate composites: structure, interaction, properties" in *Composite Interfaces* 2006, 13, (1), 1-17, discloses the preparation of clay (nano)composites based on glycerol-plasticised wheat starch. The clays used were sodium montmorillonite and clay modified with aminiododecanoic acid (NANOFIL™ 784), stearyl dihydroxyethyl ammonium chloride (NANOFIL™ 804) or distearyldimethylammonium chloride (NANOFIL™ 948). No or only limited expansion of the clay was observed.

A paper by B Chiou et al, entitled "Rheology of starch-clay nanocomposites" in *Carbohydrate Polymers* 2005, 59, (4), 467-475, discusses the rheology of thermoplastic starch-clay nanocomposites (clays used were CLOISITE™ Na+, CLOISITE™ 30B, 10A, and 15A). Various starches were examined, including wheat, potato, corn and waxy corn starch.

International patent WO 2005068364 claims starch and modified starches as intercalants for nanoclays. The method employed makes use of the water-friendly nature of clay.

Nanocomposite materials based on starch and clay having a high degree of exfoliation of the clay, and having improved properties including, for example, a high degree of transparency, improved mechanical and rheological properties and/or reduced sensitivity to moisture, would be desirable.

It has been found that use of a hydrophobic clay in the preparation of a nanocomposite material results in surprising levels of improvement in the properties of the resulting material, including in its clarity, pliability, tensile strength, impact resistance and/or tensile properties.

Thus in one aspect, the invention provides a substantially exfoliated nanocomposite material including starch and hydrophobically modified layered silicate clay.

The hydrophobically modified layered silicate clay (hereinafter "hydrophobic clay") is present preferably in an amount of 0.1% to 5% w/w, more preferably 0.1% to 3%, and most preferably 0.5% to 2%.

Preferred clays which include such long chain alkyl ammonium ions include CLOISITE™ 20A and CLOISITE™ 25A.

Preferably, the nanocomposite material includes one or more plasticisers, and/or one or more water-soluble polymers such as but not limited to polyvinyl alcohol, and/or one or more processing aids.

The starch may be blended with other suitable polymers including polyvinyl alcohol and polyesters such as polylactide and polycaprolactone. The blends used may be modified according to the functional and mechanical properties required.

The nanocomposite material preferably has water content of between 5% and 30% by weight, more preferably 5% to 15%, and most preferably 8% to 12%.

The nanocomposite material may be used, for example, as rigid thermoplastic packaging trays, injection moulded products such as bottles, flexible films and barrier films, and biomaterials. Thus in another aspect, the invention provides packaging made from material including the substantially exfoliated nanocomposite material described above.

The nanocomposite material has improved mechanical and rheological properties and reduced sensitivity to moisture in that the rates of moisture update and/or loss are reduced. The nanocomposite material has a higher melt strength which facilitates its use in processes such as foaming or film blowing, and has improved aging characteristics and reduced gas and water permeability.

The improved properties of the nanocomposite material reduce the need for plasticisers and/or processing aids. In particular, as the nanocomposite material of the invention is more plastic than other materials previously disclosed, the amount of plasticiser added may be reduced.

The nanocomposite material has improved clarity, which is an indication of exfoliation. The material becomes transparent during the preparation process, and its level of transparency continues to increase after preparation on drying to the desired moisture content. The material remains transparent for an extended time because it has a reduced rate of retrogradation.

In another aspect, the invention provides a process for preparing the substantially exfoliated nanocomposite material described above, including a step of mixing the starch in the form of an aqueous gel with the hydrophobic clay in a melt mixing device. Suitable melt mixing devices include extruders. Preferably, the clay is in the form of a powder.

In a further aspect, the invention provides a process for preparing the substantially exfoliated nanocomposite material, including the steps of mixing the starch with the hydrophobic clay to form a masterbatch (hereinafter "the masterbatch process") and mixing the masterbatch with further starch. The masterbatch is collected as strand and may be dried and pelletized for use in further processing. Preferably the masterbatch is mixed with further starch in a second and subsequent step. The second step can be performed immediately following the first step or after a period of time. The period of time of time between the first and second steps is preferably less than three months, and more preferably less than two months.

Preferably, the masterbatch process includes a step of rehydrating the masterbatch before the subsequent step of mixing the masterbatch with further starch.

Preferably, the masterbatch process includes a step of grinding and/or milling the resulting masterbatch to a powder before the subsequent step of mixing the masterbatch with further starch.

More generally, the invention provides a process for preparing a nanocomposite material, including a step of mixing starch with clay to form a masterbatch and a subsequent step of mixing the masterbatch with further starch. Preferably, the clay is present in the masterbatch in an amount of between 5% and 70% by weight.

The inclusion of a masterbatch in the process has a number of advantages. The masterbatch concentrate is easy to handle and store, and may be fed into an extruder more easily than a raw clay or a clay slurry. The use of a masterbatch also reduces potential for exposure of the operator to nanoclay dust during the subsequent step. The masterbatch may be stored for more than three months, and potentially indefinitely, in a relatively dry state with moisture content of less than 15% by weight, to be rehydrated before use. Most notably, the masterbatch process leads to improved exfoliation when compared with one step preparation.

DETAILED DESCRIPTION

Figure 1:
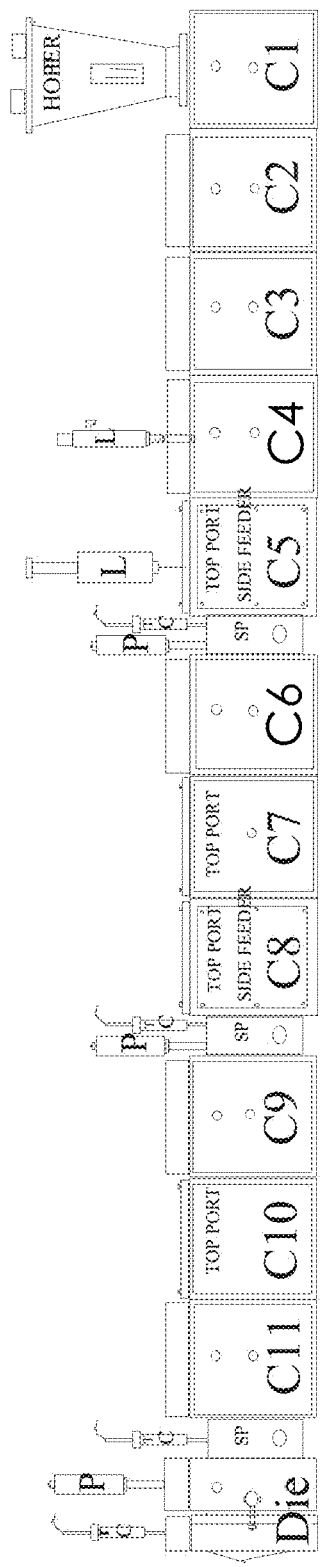
FIG. 1 is a schematic representation of one suitable extruder which may be employed in the inventive process.

In its simplest form, the substantially exfoliated nanocomposite material of the invention consists only of starch and hydrophobic clay. As would be appreciated by formulators in the art, a raft of additional compounds may be added during preparation of the nanocomposite material, including plasticisers and processing aids.

When used in the present specification, "substantially exfoliated" nanocomposite material means a material in which a majority of clay agglomerates are disrupted to tactoids and individual clay layers. Preferably, said tactoids have dimensions that are less than the wavelength of visible light such that the material appears transparent and has few visibly discernable clay particles. More preferably said tactoids comprise between 2 to 10 clay layers and have a lateral dimension of between 100 and 300 nm.

When used in the present specification, "clay" is a synthetic or natural layered silicate capable of being exfoliated into nanoparticles. Preferred clays include montmorillonite, bentonite, beidelite, mica, hectorite, saponite, nontronite, sauconite, vermiculite, ledikite, magadite, kenyaite, stevensite, volkonskoite or a mixture thereof.

A "hydrophobically modified layered silicate clay" or "hydrophobic clay" is preferably a clay modified by exchange with a surfactant comprising long chain alkyl groups such as a long chain alkylammonium ion, for example, mono- or di-$C_{12}$-$C_{22}$ alkylammonium ion, wherein polar substituents such as hydroxyl or carboxyl are not attached to the long chain alkyl. Examples of suitable clays include CLOISITE™ 20A or CLOISITE™ 25A from Southern Clay Industries. The long chain alkylammonium ion in CLOISITE™ 20A is depicted in Formula 1 and that in CLOISITE™ 25A is depicted in Formula 2.

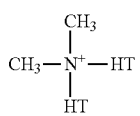

Where HT is Hydrogenated Tallow (~65% C18; ~30% C16; ~5% C14)

Anion: Chloride

Formula 1: Long chain alkylammonium ion in CLOISITE™ 20A

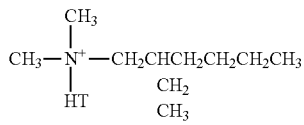

Where HT is Hydrogenated Tallow (~65% C18; ~30% C16; ~5% C14)

Anion: Methyl Sulfate

Formula 2: Long chain alkylammonium ion in CLOISITE™ 25A

The surfactant in CLOISITE™ 20A includes two hydrophobic hydrogenated tallow long chains, and does not include polar substituents such as hydroxyl or carboxyl. That in CLOISITE™ 25A includes one hydrophobic hydrogenated tallow long chain, and a second chain which is six carbon atoms in length. Again, the modifier does not include hydroxyl or carboxyl substituents.

Examples of unsuitable surfactants include CLOISITE™ Na$^+$ and CLOISITE™ 30B, which is depicted in Formula 3.

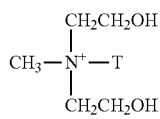

Where T is Tallow (~65% C18; ~30% C16; ~5% C14)

Anion: Chloride

Formula 3: CLOISITE™ 30B

CLOISITE™ 30B is unsuitable as it has polar hydroxyl groups. CLOISITE™ Na is unsuitable as it does not include any long chain alkyl organic modifiers.

Other modifying agents such as suitable phosphonium ion or suitable non-ionic surfactants may also be used.

The hydrophobic clay may be preformed or may be formed in situ during production of the nanocomposite or nanocomposite masterbatch from unmodified clay and the modifying agent.

The starch may be a natural or derivatized starch such as corn (maize) starch, potato starch, tapioca starch, wheat starch, rice starch, cassava starch, arrowroot starch or sago starch. Starch consists of amylopectin, amylose and other minor components. High amylose starch is preferred, although low amylose starch may also be employed. Derivatized starches include esters such as acetylated starch or starch succinate, or carboxymethylated starch, and ethers, such as hydroxyalkylated starch, preferably hydroxypropylated starch. Derivatised starches may be formed as the reaction product of starch with epoxides, cyclic lactones, cyclic carbonates, cyclic and acyclic anhydrides. A high amylose hydroxypropylated starch such as one having an amylose level above 50%, for example GELOSE™ A939 (Penford) or ECOFILM™ (National Starch & Chemical Company) or equivalent starch is preferred. The most appropriate starch is to be selected based on the properties required of the product and its processability. The starch is present preferably in an amount of 5% to 99% by weight.

Although the water present by virtue of the starch may act as a plasticiser, any other suitable hydrophobic or hydrophilic plasticiser may also be introduced into the process if required. Suitable plasticisers include polyols and may be one or more of poly(vinyl alcohol) (such as ELVANOL™), sorbitol, maltitol, glycerol, mannitol, xylitol, erythritol, ethylene glycol and diethylene glycol.

Suitable processing aids include $C_{12}$-$C_{22}$ fatty acids and their salts such as stearic acid, calcium stearate, sodium stearate, palmitic acid and lauric acid.

The process of nanocomposite material formation can be perfomed by direct addition of the hydrophobic clay as a dry powder, as a powder moistened with water or a plasticiser, as an aqueous slurry or as a starch based masterbatch. Preferably, the process of nanocomposite material formation is performed as a masterbatch process. Firstly, a starch clay masterbatch containing 5% to 70% by weight clay is prepared by mixing the starch, the hydrophobic clay, one or more plasticisers and optionally one or more processing aids or other components.

The masterbatch is collected as strand and may be dried and pelletized for use in the second step. If the masterbatch is to be stored for a long period it is preferred to have a low water content, preferably between 5% and 15% by weight. The masterbatch is rehydrated by addition of water and equilibrated to have a water content which is preferably between 15% and 30%, more preferably between 20% and 30% by weight.

Subsequently, a nanocomposite material containing 0.1% to 5% clay by weight is prepared by mixing the masterbatch with further starch and optionally plasticisers and processing aids.

The materials may be extruded. Preferred conditions for the extrusion are a maximum temperature of between 120 and 140° C. and pressure of between 1 and 4 atmospheres.

The process includes premixing the modified starch, clay, or clay masterbatch, and any other dry components to produce a mixture. This can be carried out in any conventional mixer. The mixture can be introduced into a screw extruder and subjected to elevated temperatures by the shearing action of the screw and the application of external heat to the barrel. The temperature can be raised to a range of about 120° C. to about 180° C. The material is best manufactured by means of extrusion compounding, using co- or counter-rotating twin screw or selected design single screw extruders. Twin screw co-rotating compounding, with an extrusion pressure of at least about 5 or about 10 bar (1 bar=100 kPa) and with a screw speed of at least about 80 rpm or about 100 rpm.

Water can be introduced substantially simultaneously with the start of extrusion such as in the initial barrel sections by means of liquid injection for "gelatinising" (also referred to as destructurising, cooking, or melting) the starch into a polymeric gel structure. Starch was cooked by the combined action of water, elevated temperature and shear provided by the screw. Water may also serve to dissolve any other water soluble polymers added, such as poly(vinyl alcohol) and to act as a plasticiser in the end-product thereby softening the material and reducing the modulus and brittleness. The melt and/or destructurised starch nanocomposite blend can then be propelled toward the die and in moving forward the temperature can be reduced to prevent foaming without the need for venting. Alternatively, a foaming agent may be added to the combination during the process. Water may be added to a calculated concentration of about 10% to 50% by weight, preferably about 20% to 40% by weight, more preferably about 22% to about 40% by weight, or even more preferably about 25% to about 35% by weight of the total mixture or another mixture. During and following cooking of the starch the extruder serves to mix and homogenize the nanocomposite composition. A typical residence time in the extruder is between 1 and 2.5 min, depending on temperature profile and screw speed.

Whilst not intending to be bound by theory, it is speculated that modifying the clay so that it becomes hydrophobic may enable the clay particles to come apart more easily. This may result in the high level of exfoliation observed in the resulting nanocomposite material.

EXAMPLES

Materials

CLOISITE™ 20A, a natural montmorillonite modified by dimethyl di(hydrogenated tallow) quaternary ammonium chloride from Southern Clay Industries CLOISITE™ 25A, a natural montmorillonite modified by dimethyl 2-ethylhexyl (hydrogenated tallow) ammonium methylsulfate from Southern Clay Industries CLOISITE™ 93A, a natural montmorillonite modified with methyl di(hydrogenated tallow) ammonium bisulfate from Southern Clay Industries GELOSE™ A939, a high amylose corn starch, GELOSE™ 80, with a quoted amylose content of ~80%, modified by reaction with propylene oxide to form 6.5% hydroxypropyl substitution (w/w). GELOSE™ A939 was obtained from Penford, Australia ECOFILM™, high amylose corn starch, HYLON™ VII, with a quoted amylose content of ~70%, modified by reaction with propylene oxide to give 6.5% hydroxypropyl residues (w/w). It was obtained from National Starch and Chemical Company Poly(vinyl alcohol), ELVANOL™ from Dupont Stearic acid, PALMERA™ from Palm-Oleo BHD Equipment A twin screw extruder including ten temperature controlled barrel zones, three unheated zones, and a cooled feed block was used for clay-starch masterbatch preparation. Materials were fed into the extruder via a gravimetric feeder. The extruder was operated in co-rotating (intermeshing self wiping) mode. The melt temperature was monitored at three positions along the barrel and in the die. A schematic representation of one suitable extruder is shown in FIG. 1.

Starch and clay were fed into the barrel through the hopper at C1. Water was injected into the barrel through a liquid pump at C4. Temperature zones from C5 to C9 are cooking zones and full gelatinization should be completed in these zones. Die or sheet die is after C11. The temperature profiles with ten heating zones and die were controlled as follows:

TABLE 1

Temperature profiles of extrusion

| Starch type | Temperature profiles (° C.) | Die temperature (° C.) | Sheet die temperature (° C.) |
|---|---|---|---|
| For GELOSE ™ A939 masterbatch | 60, 80, 90, 110, 120, 120, 115, 110, 75, 80 | 80 | |

TABLE 1-continued

Temperature profiles of extrusion

| Starch type | Temperature profiles (° C.) | Die temperature (° C.) | Sheet die temperature (° C.) |
|---|---|---|---|
| For GELOSE ™ A939 2$^{nd}$ extrusion | 60, 80, 90, 120, 130, 130, 130, 120, 110, 80 | 80 | 90 |

The proportions quoted in the following tables are weight percentage. They are not dry weights. They include the moisture contained in the materials. The typical moisture content of GELOSE™ A939 is 11%·(w/w).

Processing of clay-starch masterbatch was carried out in a laboratory scale co-rotating twin screw extruder. The general screw geometry was: diameter 27 mm, L/D ratio 48, and maximum rotation speed 1200 rpm. Materials were fed into the extruder via a gravimetric feeder. In the extruder, the materials went through convey, water, blend, compress, mix, convey, mix, compress, mix, convey, and compress stages. The melt temperature was monitored at three positions along the barrel and in the die. The temperature profiles were controlled as follows:

TABLE 2

Temperature profiles of sheet extrusion from clay-starch masterbatch

| Material | Temperature profiles (° C.) | Sheet die temperature (° C.) |
|---|---|---|
| Clay-starch masterbatch | 40, 70, 80, 90, 95, 120, 140, 150, 150, 140, 120, 100, | 105, 100, 105 |
| Control 1 (without clay-starch masterbatch) | 40, 70, 80, 90, 95, 120, 140, 150, 150, 140, 120, 100, | 105, 100, 105 |
| Control 2 (without clay-starch masterbatch) | 40, 70, 80, 90, 95, 120, 130, 135, 135, 130, 120, 100, | 105, 100, 105 |

Trays were thermoformed from sheet produced from the range of formulations by using a contact heat thermoforming machine. The key thermoforming conditions were: heating time 1 s, heat vent time 0.5 s, form time 1 s, form vent time 0.4 s, thermoforming temperature 125° C., and mould heat temperature 21° C.

The following examples demonstrate processes for production of masterbatches and of nanocomposites formed using said masterbatches according to the invention.

Examples 1 and 2

The examples tabulated in Table 3 demonstrate clay-starch masterbatch preparation.

The following procedure is typical:

Preparation of 10% clay masterbatch (CLOISITE™ 25A)

GELOSE™ A939 (16.2 kg), PVOH (1.62 kg), stearic acid (180 g) and CLOISITE™ 25A (2 kg) were combined in a tumble mixer for 2 h. The mixed powder was fed to the main feed hopper of the extruder via a gravimetric feeder through an auger at rate of 3.5 kg/h. The temperature profile was set as shown in Table 1. Water was injected into the barrel through a liquid pump at a flow rate of 26 g/min. The screw speed was 162 rpm. The extrudate strand was collected, air-dried overnight and pelletized.

TABLE 3

Preparation of the masterbatch

| Example | Clay type | Clay (%) | GELOSE ™ A939 (%) | PVOH (%) | Stearic acid (%) |
|---|---|---|---|---|---|
| 1 | CLOISITE ™ 25A | 10.00 | 81.00 | 8.10 | 0.90 |
| 2 | CLOISITE ™ 20A | 10.00 | 81.00 | 8.10 | 0.90 |

Examples 3 to 5

The examples tabulated in Table 4 demonstrate the preparation of starch nanocomposite sheet (2% CLOISITE™ 25A) from 10% clay masterbatch The following procedure is typical:

A starch mixture was prepared comprising GELOSE™ A939 (9 kg), PVOH (0.9 kg) stearic acid (0.1 kg) and mixed in the tumble mixer for 2 h. The dry masterbatch pellets (from Example 1 above) were hydrated (the water was added into the mixer at a flow rate of 2 mL/min) in a tumble mixer overnight to achieve a final water content of approximately 26%. The temperature profile was set as shown in Table 1 for the $2^{nd}$ extrusion. The screw speed was 162 rpm. The starch mixture was fed via a gravimetric feeder to the main hopper at a rate of 2.8 kg/h. The hydrated masterbatch pellets were fed via a second gravimetric feeder to the main hopper at a rate of 700 g/h. Water was injected at a flow rate of 26 g/min. The extrudate sheet was collected, air-dried for 2 h, rolled and stored in plastic bags.

TABLE 4

Preparation of starch composite sheet

| | | Masterbatch | Final composition | | | |
|---|---|---|---|---|---|---|
| Example | Clay type | example (feed rate - g/h) | Clay (%) | GELOSE ™ A939 (%) | PVOH (%) | Stearic acid (%) |
| control | none | — (1750) | 0 | 90 | 9 | 1 |
| 3 | CLOISITE ™ 25A | 1 (350) | 1.00 | 89.10 | 8.91 | 0.99 |
| 4 | CLOISITE ™ 25A | 1 (700) | 2.00 | 88.20 | 8.82 | 0.98 |
| 5 | CLOISITE ™ 25A | 1 (1750) | 5.00 | 85.50 | 8.55 | 0.95 |

Total feed rate (starch mixture+masterbatch) 3.5 kg/h

The examples prepared with hydrophobic clays possessed exceptional clarity and substantially higher melt strength compared to a control without CLOISITE™. This improvement in properties was most marked for composites prepared with the more hydrophobic CLOISITE™ 25A Examples 6 to 8

The examples tabulated in Table 5 demonstrate clay-starch masterbatch preparation.

Procedures of Starch Composite Preparation (CLOISITE™ 20A)

Preparation of 10% CLOISITE™ 20A masterbatch

The following procedure is typical:

GELOSE™ A939 (16.2 kg), PVOH (1.62 kg), stearic acid (180 g) were mixed in a mixer for 2 h. The mixed powder was fed into barrel via a gravimetric feeder through hopper at rate of 3.15 kg/h. CLOISITE™ 20A was fed into barrel through hopper at a flow rate of 350 g/h. The temperature profile was set as shown in Table 1 for master batch. Water was injected into the barrel through a liquid pump at a flow rate of 26 g/min. The screw speed was 162 rpm. The extrudate strings were collected, air-dried overnight and pelletized.

Plasticisers such as sorbitol, erythritol and xylitol may be added to the powder before the powder was fed into the barrel.

TABLE 5

Preparation of masterbatch

| Example | Clay type | Clay (%) | GELOSE ™ A939 (%) | PVOH (%) | Stearic acid (%) |
|---|---|---|---|---|---|
| 6 | CLOISITE ™ 25A | 5.00 | 85.50 | 8.55 | 0.95 |
| 7 | CLOISITE ™ 93A | 5.00 | 85.50 | 8.55 | 0.95 |
| 8 | CLOISITE ™ 20A | 5.00 | 85.50 | 8.55 | 0.95 |

Examples 9 to 15

The examples in Table 6 demonstrate preparation of starch composite sheet from 5% clay masterbatch.

The dry masterbatch pellets were hydrated in a mixer overnight to achieve a water content of approximately 26%. Water was added into the mixer at a flow rate of 2 ml/min. The mixed powder was fed into the barrel via a gravimetric feeder through the hopper at rate of 2.8 kg/h. The hydrated masterbatch pellets were fed into barrel via a feeder at a rate of 700 g/h. The temperature profile was set as shown in Table 1 for the $2^{nd}$ extrusion. Water was injected into the barrel through a liquid pump at a flow rate of 27 g/min. The screw speed was 162 rpm. The extrudate sheets were collected, air-dried for 2 h, rolled into a coil and stored.

TABLE 6

Preparation of starch composites

| | | | Final composition | | | |
|---|---|---|---|---|---|---|
| Example | Clay type | Masterbatch entry | Clay (%) | GELOSE ™ A939 (%) | PVOH (%) | Stearic acid (%) |
| 9 | CLOISITE ™ 25A | 2 | 1.00 | 89.10 | 8.91 | 0.99 |
| 10 | CLOISITE ™ 25A | 2 | 5.00 | 85.50 | 8.55 | 0.95 |
| 11 | CLOISITE ™ 93A | 4 | 1.00 | 89.10 | 8.91 | 0.99 |
| 12 | CLOISITE ™ 93A | 4 | 2.00 | 88.20 | 8.82 | 0.98 |
| 13 | CLOISITE ™ 20A | 5 | 0.50 | 89.55 | 8.955 | 0.995 |
| 14 | CLOISITE ™ 20A | 5 | 1.00 | 89.10 | 8.91 | 0.99 |
| 15 | CLOISITE ™ 20A | 5 | 2.00 | 88.20 | 8.82 | 0.98 |

The examples prepared with clays possessed exceptional clarity and substantially higher melt strength with respect to a control without CLOISITE™. This improvement in properties was most marked for samples prepared with the more hydrophobic clays CLOISITE™ 20A and CLOISITE™ 25A.

Examples 16 to 17

The examples demonstrate 50% clay-starch masterbatch preparation and are tabulated in Table 7.

The following procedure is typical:

Procedures of starch composite preparation (CLOISITE™ 25A)

GELOSE™ A939 (9.0 kg), PVOH (0.9 kg), stearic acid (100 g) and CLOISITE™ 25A (10.0 kg) were mixed for 2 h in rotary mixer. The mixed powder was fed into a barrel via a gravimetric feeder at rate of 3.5 kg/h. The temperature profile was set as shown in Table 1 for the masterbatch. Water was injected into the barrel through a liquid pump at a flow rate of 25 g/min. The screw speed was 162 rpm. The extrudate strand was collected, air-dried overnight and pelletized.

TABLE 7

Preparation of the 50% clay masterbatch

| Example | Clay type | Clay (kg) | GELOSE ™ A939 (kg) | PVOH (kg) | Stearic acid (%) |
|---|---|---|---|---|---|
| 16 | CLOISITE ™ 25A | 10.00 | 9.00 | 0.90 | 0.10 |
| 17 | CLOISITE ™ 20A | 10.00 | 9.00 | 0.90 | 0.10 |

Examples 18 to 29

Comparative Transparency of CLOISITE™ Na and CLOISITE™ 20A

TABLE 8

Formulation R1

| | Composition % · w/w |
|---|---|
| GELOSE ™ A939 starch (including 12% moisture) | 90.0 |
| PVOH (ELVANOL ™) | 9.0 |
| Stearic acid | 1.0 |
| TOTAL DRY MIX | 100.0 |

The formulation R1 is a composite which does not include a nanoclay and is used for comparative purposes in these examples.

As discussed in the Detailed Description, CLOISITE™ 20A is significantly more hydrophobic than CLOISITE™ Na.

Examples 18 to 29 demonstrate that formulations including the hydrophobically modified layered silicate clay CLOISITE™ 20A are significantly more transparent than formulations including either the more hydrophilic clay CLOISITE™ Na or that containing no clay.

UV-visible spectra were obtained over wavelength range of 800 to 200 nm at 1008 nm·min$^{-1}$. Transmittance was recorded and related to absorbance by the equation $A = -\log(T)$. Transparency was calculated based on the transmitted light from 350 to 800 nm and divided by 100% transmitted light. Optical absorbance coefficient (OAC) was determined by normalisation of specimen thickness. The OAC was compared with R1 produced on the same day (or series) as the composites. The relative changes are listed in Table 9.

TABLE 9

UV-visible Transparency and comparison to R1 produced on the same day.

| Example Composition | Clay type | Clay (%) | Transparency (%) | Optical Absorbance Coefficient (m$^{-1}$) |
|---|---|---|---|---|
| 18 | Na | 1 | 67.78 | 614 |
| 19 | — | — | 71.79 | 543 |
| 20 | Na | 2 | 70.56 | 571 |
| 21 | Na f | 3 | 66.94 | 709 |
| 22 | Na c | 3 | 67.41 | 772 |
| 23 | Na | 5 | 68.11 | 641 |
| 24 | 20A | 1 | 84.41 | 260 |
| 25 | 20A | 2 | 83.92 | 304 |
| 26 | 20A f | 3 | 82.68 | 306 |
| 27 | — | — | 77.83 | 394 |
| 28 | 20A c | 3 | 84.03 | 308 |
| 29 | 20A | 5 | 83.32 | 288 | f = masterbatch was fed directly to the extruder using feeder 2;
c = starch and masterbatch were blended in a concrete mixer before being fed into the extruder.

CLOISITE™ Na

All of the CLOISITE™ Na nanocomposites showed an increased OAC indicating a reduced transparency compared with the R1 made on same day. The OAC of R1 was 543 m$^{-1}$. Inclusion of 1% CLOISITE™ Na resulted in OAC of 614 m$^{-1}$, an increase in OAC, therefore a reduction in transparency.

The OAC was increased up to 42% with 3% CLOISITE™ Na concrete mixer method, in the worst case. The 3% CLOISITE™ Na feeder and 5% CLOISITE™ Na faired similarly in OAC. The 2% CLOISITE™ Na showed lower OAC compared with the concrete mixer preparation, 5% higher than R1.

CLOISITE™ 20A

Remarkable improvements in transparency, as indicated by reduction in OAC were observed across all compositions when compared with the R1 control made on same day. The OAC of R1 listed in Table 9 was 394 m$^{-1}$. Improvements of at least 21 to 49% in OAC reduction have been obtained for CLOISITE™ 20A nanocomposites. The most transparent were 1 and 5% CLOISITE™ 20A with OAC of 260 m$^{-1}$ and 288 m$^{-1}$, respectively. Addition of 2-3% CLOISITE™ 20A exhibited similar OAC between 300 to 310 m$^{-1}$. Of the 3% CLOISITE™ 20A nanocomposite, the concrete mixer method provided better consistency and lower variability in the measured transparency. This may be attributed to a more homogeneous input into the extruder.

Discussion

The introduction of CLOISITE™ Na resulted in a reduction in transparency and an apparent yellowness observed in the sheet materials. Conversely, the inclusion of CLOISITE™ 20A in amounts of up to about 5% proved beneficial in increasing the transparency of the sheet. The improvement was most significant with 1 to 2% CLOISITE™ 20A.

Examples 30 to 36

Mechanical Tensile Properties of CLOISITE™ 20A

The mechanical tensile experiments demonstrate that the addition of CLOISITE™ 20A improves mechanical tensile properties of sheet material.

Sheets were cut into strip (25×200 mm$^2$). Four thickness measurements were made for each strip. Mechanical tensile tests were conducted according to ASTMD882. The extension rate of 10 mm·min$^{-1}$ was used with a 2 kN load cell. The thermoplastic composites were conditioned for 48 h at 50% and 25% relative humidity prior to testing. The average specimen thickness was 250 μm. Statistical analysis was performed for minimum of n=10 replicate specimens per composite. Tensile tests of thermoplastic starch films were conducted both in machine direction (MD) and transverse to the direction of extrusion (TD). The results are shown in Table 10.

TABLE 10

Summary of Elongation break of sheets as affected by relative humidity with reference to extrusion direction.

| | Ratio of Elongation break values | | |
|---|---|---|---|
| Sheets | Machine/ transverse (50% RH) | 50% RH/ 25% RH (machine) | 50% RH/ 25% RH (transverse) |
| Example 30 - R1 | 6.27 | 2.95 | 2.52 |
| Example 31 - R1, 1% 20A | 1.96 | 2.58 | 2.43 |
| Example 32 - R1, 2% 20A | 1.54 | 2.27 | 1.97 |
| Example 33 - R1, 3% 20A, Feeder | 1.69 | 2.19 | 1.58 |
| Example 33 - R1 | 4.59 | 3.04 | 2.37 |
| Example 34 - R1, 3% 20A concrete mix | 1.09 | 2.25 | 1.72 |
| Example 35 - R1, 5% 20A concrete mix | 0.90 | 1.67 | 1.81 |

When relative humidity of the environment decreased from 50% to 25%, significant increases were found in the E-modulus values and Fmax values of both CLOISITE™ 20A sheets and R1 sheet, due to the loss of plasticizing water, whereas significant decrease in elongation break values were found in all sheets.

Adding CLOISITE™ 20A provided a more isotropic sheet as indicated by the elongation at break being similar in the machine and transverse directions. For example, for R1 the ratio of elongation break value in the machine direction to that in the transverse direction was 5-6, whereas ratios for the CLOISITE™ 20A nanocomposite sheet were between 1-2 (Table 10).

Adding CLOISITE™ 20A slightly improved mechanical performance tolerance with change in humidity from 50% RH and 25% RH (Table 10). In the machine direction, ratio of elongation break value for R1 at 50% RH to 25% RH was 3, whereas ratios for the composite sheet was between 1.67-2.58. In the transverse direction, ratio of elongation break value for R1 at 50% RH to 25% RH was 2.37-2.52, whereas ratios for the composite sheet were between 1.58-2.43.

Examples 30 to 36

WAXS of CLOISITE™ 20A

The WAXS experiments demonstrate that the formulations including 1% or 2% CLOISITE™ 20A were substantially exfoliated.

Figure 2:
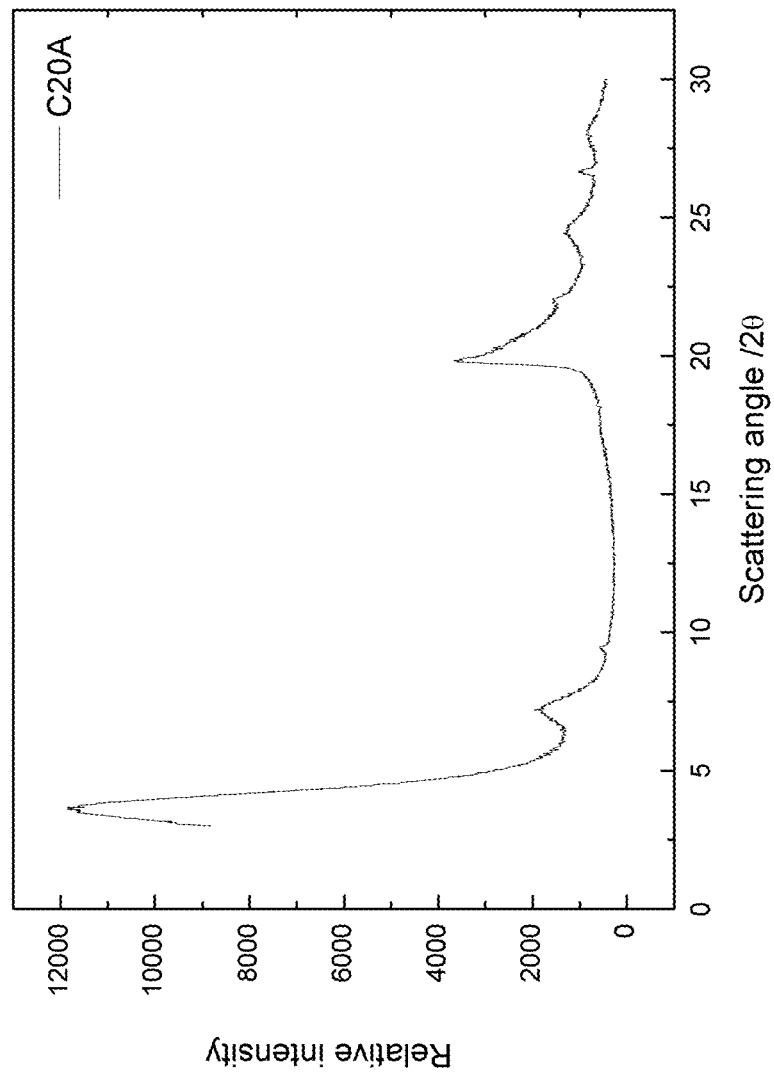
FIG. 2 is a reference wide angle X-ray scattering (WAXS) graph of CLOISITE™ 20A according to Examples 30 to 36.
Figure 3:
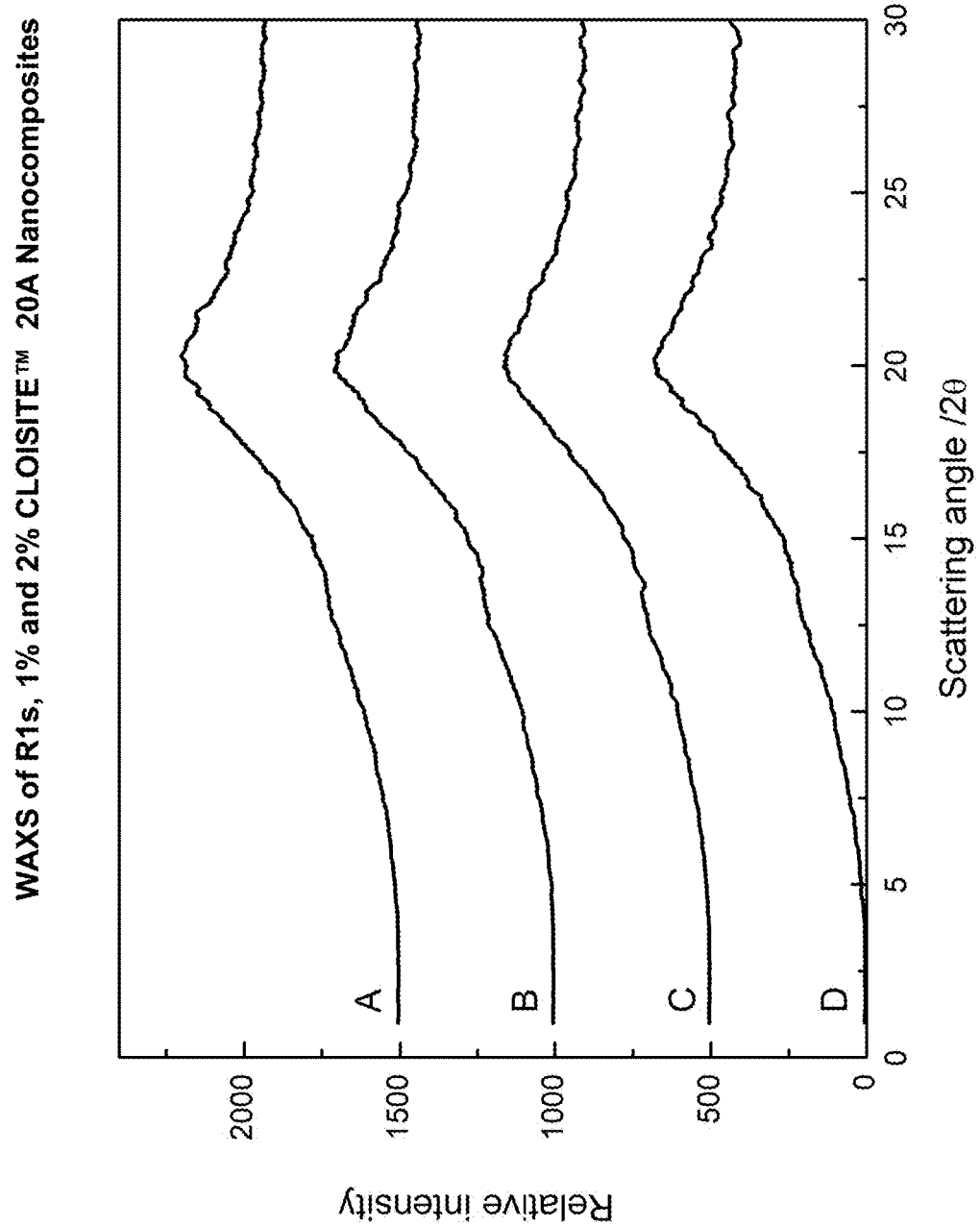
FIG. 3 is WAXS patterns for R1 and of the 1% and 2% CLOISITE™ 20A nanocomposites according to Examples 30 to 36.
Figure 4:
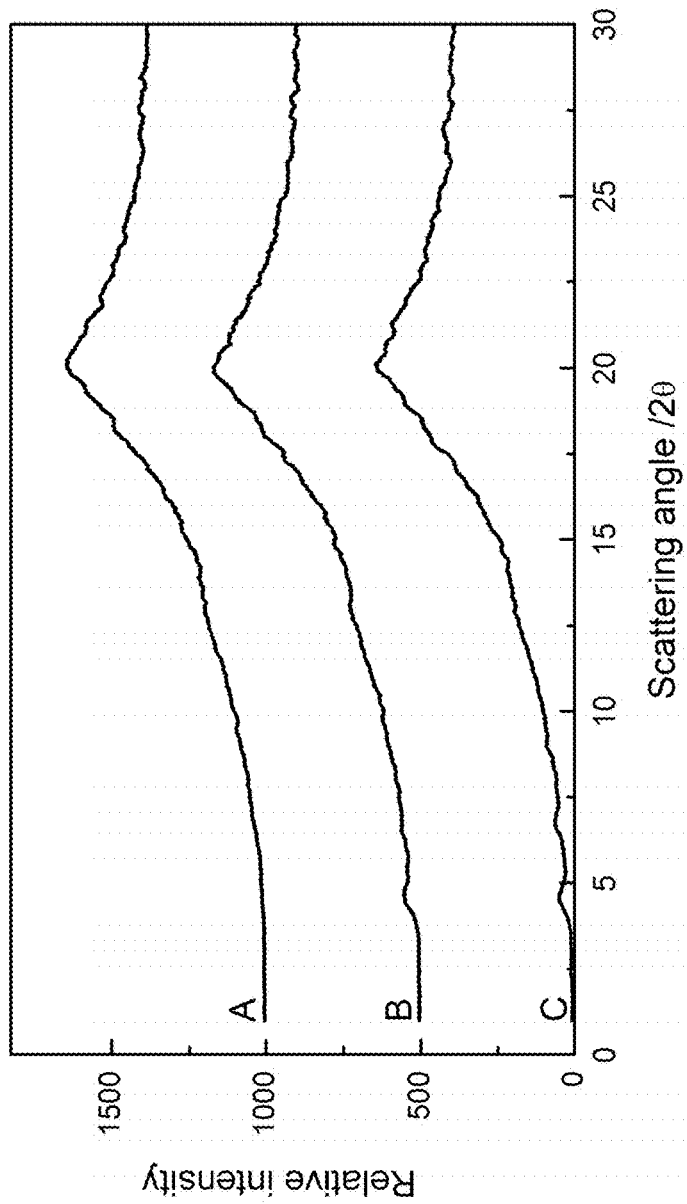
FIG. 4 is WAXS patterns for the 3% and 5% CLOISITE™ 20A nanocomposites according to Examples 30 to 36.

The reference WAXS pattern for CLOISITE™ 20A is shown in FIG. 2. FIG. 3 shows the WAXS patterns for R1 and of the 1% and 2% CLOISITE™ 20A nanocomposites. They show no peaks due to clay and indicate an exfoliated structure was obtained. FIG. 4 shows patterns for the 3% and 5% nanocomposites. The WAXS pattern obtained for the 3% CLOISITE™ 20A (concrete) nanocomposite suggests a high degree of exfoliation as no clay peaks were observed. The 3% CLOISITE™ 20A (feeder) and 5% CLOISITE™

20A nanocomposites show a small peak at 2θ of 4.6° This suggests that the concrete method gave greater exfoliation of the clay.

Examples 30 to 36

Thermogravimetry of CLOISITE™ 20A

The thermogravimetry experiments demonstrate that formulations with CLOISITE™ 20A have high thermal stability and low mass loss rates.

Figure 5:
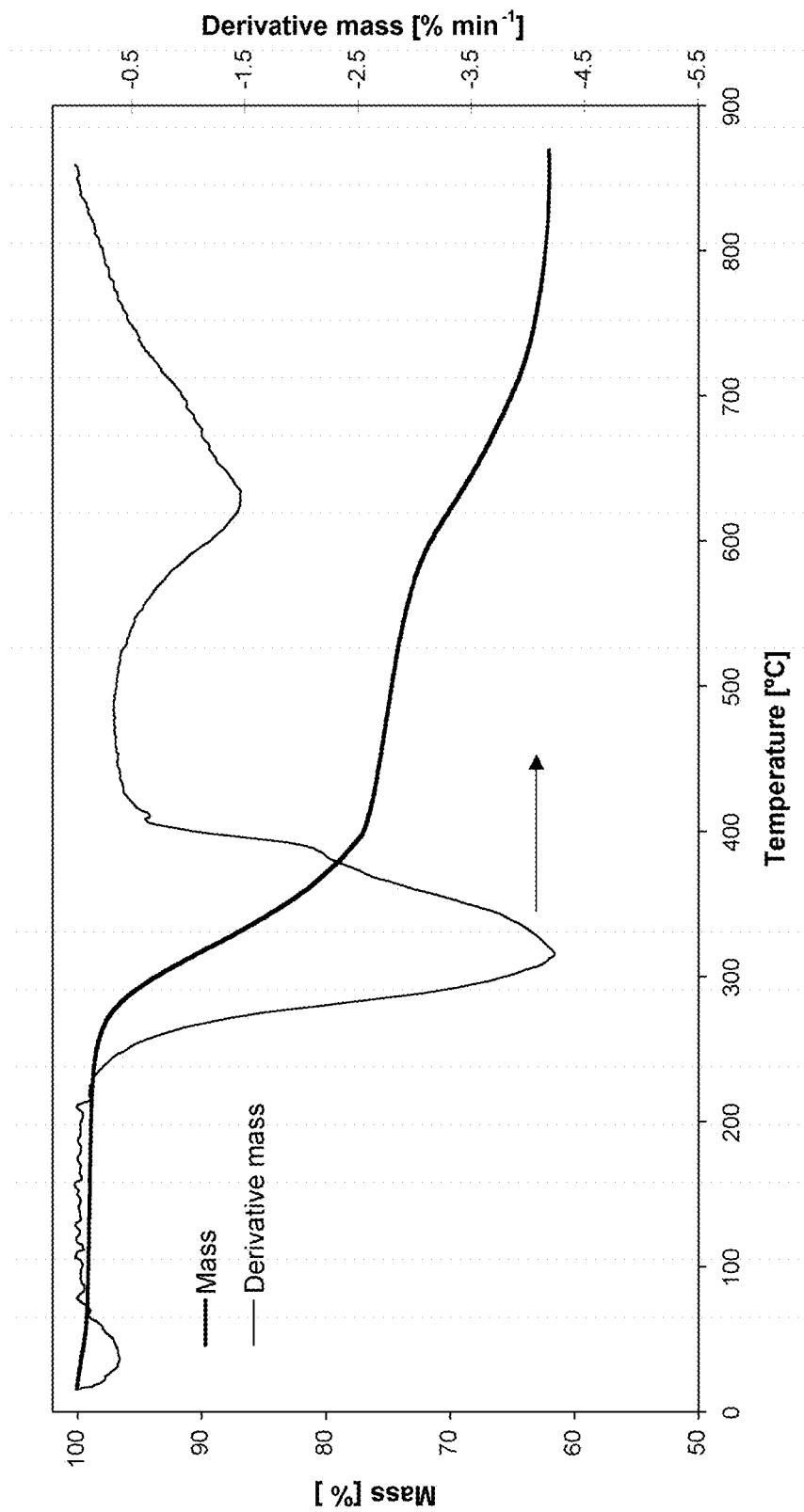
FIG. 5 is a thermograph of CLOISITE™ 20A according to Examples 30 to 36.

FIG. 5 provides a thermogram of CLOISITE™ 20A. Three mass loss stages occurred, the first at ~38° C., main degradation at 315° C., followed by a broad loss at 629° C. Mass losses can be attributed to water losses and addition degradation of organic modifier.

Figure 6A:
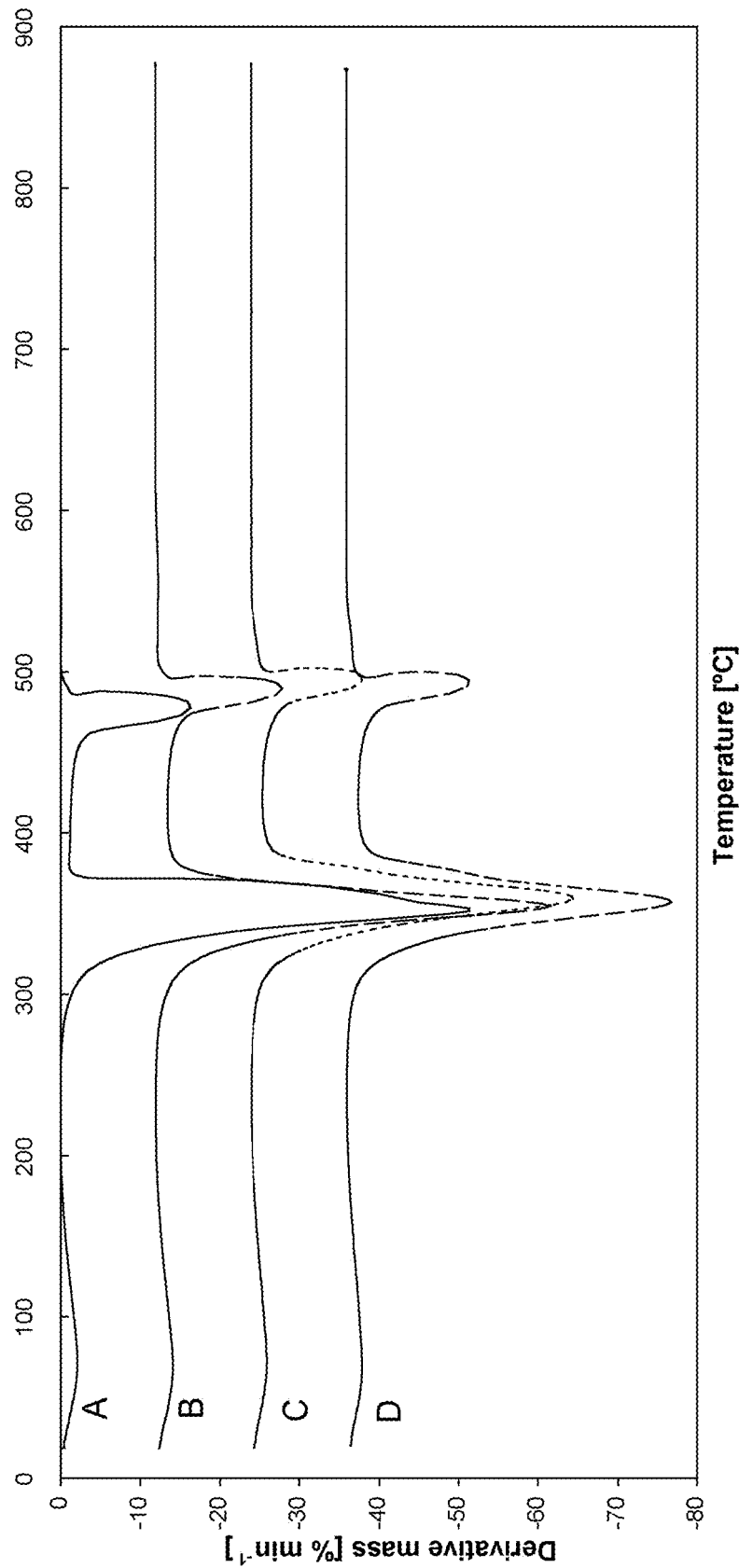
FIGS. 6A and 6B are thermogravimetric derivative mass curves for R1 and CLOISITE™ 20A nanocomposites according to Examples 30 to 36.
Figure 6B:
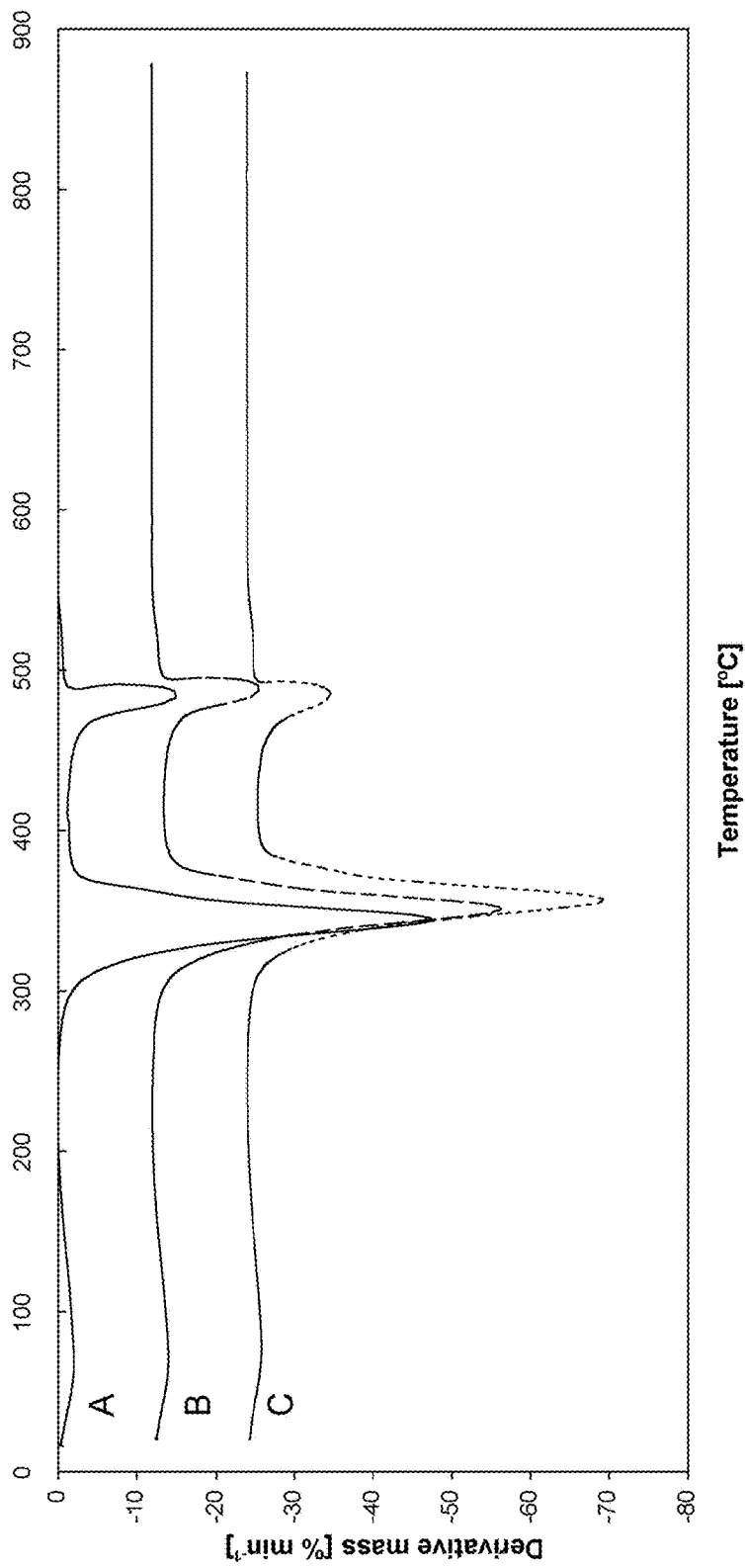

FIG. 6A and FIG. 6B show the thermogravimetric derivative mass curves for R1 and CLOISITE™ 20A nanocomposites. Table 11 lists extracted data for the sheets. R1 made on the two different days showed some differences in the thermogram, mainly in the third decomposition step. The 1% and 2% CLOISITE™ 20A slowed the mass loss rates in all the steps as listed in Table 11.

Composite 3% concrete seemed to show higher mass loss rates in all decomposition steps compared with 3% feeder nanocomposite. The 5% nanocomposite exhibited higher thermal stability and generally lower rates of mass loss compared to other nanocomposites and R1.

Composite 2% CLOISITE™ 20A seemed to show optimal properties; ie, low mass loss rates (broader peak in derivative curve), and higher thermal stability than R1.

TABLE 11

Thermogravimetric mass loss, rate and temperature data

| Composition | Clay in composite (%) | Mass remain i (%) | Mass loss (temp, rate % · min$^{-1}$) | Mass loss (temp, rate % · min$^{-1}$) | Mass loss (temp, rate % · min$^{-1}$) |
|---|---|---|---|---|---|
| CLOISITE ™ 20A | | 62.5 | 1.0 (38.5, 0.39) | 24.0 (315, 4.2) | 13.0 (629, 1.5) |
| 070417-1 | 0 | 0.73 | 10.8 (70.2, 2.2) | 68.3 (353, 51.4) | 19.5 (479, 16.4) |
| 070417-2 | 1 | 1.74 | 11.1 (73.1, 2.05) | 67.9 (360, 40.5) | 18.9 (497, 13.9) |
| 070417-3 | 0 | 0.49 | 10.9 (69.5, 2.2) | 68.2 (355, 49.6) | 18.8 (490, 15.9) |
| 070417-4 | 2 | 1.59 | 10.8 (70.2, 1.9) | 69.3 (357, 40.9) | 18.0 (493, 15.4) |
| 070417-5 | 3 f | 2.08 | 10.9 (71.5, 2.1) | 68.2 (352, 44.3) | 17.0 (488, 13.6) |
| 070417-6 | 3 c | 1.99 | 11.3 (68.8, 2.0) | 68.0 (344, 47.4) | 17.2 (485, 14.9) |
| 070417-7 | 5 | 3.13 | 10.9 (76.2, 1.9) | 66.8 (357, 45.3) | 16.7 (486, 10.6) |

Examples 37 to 43

Processing, Thermoforming and Drop Test of CLOISITE™ 20A

Examples 37 to 43 demonstrate that trays including CLOISITE™ 20A were clearer having significantly better drop test performance.

Master batch pellets were ground into powder. The following sheets were extruded:
Example 37-R1
Example 38-R1, 1% 20A
Example 39-R1, 2% 20A
Example 40-R1, 3% 20A (masterbatch added by feeder 2)
Example 41-R1
Example 42-R1, 3% 20A (masterbatch mixed with starch in concrete mixer)
Example 43-R1, 5% 20A.

The formulation of each sheet is summarised in Table 12.

TABLE 12

The formulations of CLOISITE ™ 20A sheets

| Supplier | Product Batch | Eg 37 (kg) | Eg 38 (kg) | Eg 39 (kg) | Eg 40 (kg) | Eg 41 (kg) | Eg 42 (kg) | Eg 43 (kg) |
|---|---|---|---|---|---|---|---|---|
| Penford | A939 (C7317-09) | 10.197 | 10.197 | 10.197 | 10.197 | 10.197 | 10.197 | 7.05 |
| DuPont | PVOH 71-30 | 0.9 | 0.9 | 0.9 | 0.9 | 0.9 | 0.9 | 0.62 |
| Acid-Chem International | Stearic Acid | 0.06 | 0.06 | 0.06 | 0.06 | 0.06 | 0.06 | 0.04 |
| Clay Clositie | 20AMB | | 0.22 | 0.46 | 0.72 | | 0.72 | 0.88 |

All nanocomposite sheets and R1 sheets were extruded at a temperature around 130° C. The processing conditions are summarized in Table 13.

TABLE 13

Example 37 to 43 processing conditions

| Example No. | Barrel Temp (° C.) |
|---|---|
| 37 | 35, 70, 80, 90, 95, 130, 135, 135, 130, 120 |
| 38 | 35, 70, 80, 90, 95, 130, 135, 135, 130, 120 |
| 39 | 35, 70, 80, 90, 95, 130, 135, 135, 130, 120 |
| 40 | 40, 70, 80, 90, 95, 130, 135, 135, 130, 120 |
| 41 | 35, 70, 80, 90, 95, 130, 135, 135, 130, 120 |
| 42 | 35, 70, 80, 90, 95, 130, 135, 135, 130, 120 |
| 43 | 35, 70, 80, 90, 95, 130, 135, 135, 130, 120 |

The output rate for each example was 7 to 15 kg/h, and the extruder speed for each example was 450 rpm.

Thermoforming of Trays

Trays were thermoformed from sheet about 250 μm (0.25 mm) thick into chocolate trays of 13.5×13.5 cm using a thermoforming machine. The key thermoforming conditions were: heating time 1 s, heat vent time 0.5 s, form time 1 s, form vent time 0.4 s, thermoforming temperature 125° C., and mould heat temperature 21° C.

All CLOISITE™ 20A sheets had similar thermoforming properties to R1 control. Trays made from CLOISITE™ 20A sheets were clearer than trays made from R1 control.

Drop Test

For drop tests, the tray cavities were filled with moulded plastic pieces corresponding to the weight of chocolate pieces totaling 125 g and the filled tray, packaged in a secondary carton package, was let drop from a height of either 0.9 m or 1.5 m, depending on the relative humidity conditions. Drop tests at 50%·RH (and 23° C.) were carried out from a height of 1.5 m, while at 35%·RH the packed trays were dropped from a height of 0.9 m. A total of 10 trays were dropped for each trial. The damaged trays were rated thereafter, according to the following scale and definitions, where each tray is fitted into the highest numbered (worst performing) category applicable.

In Table 14 below, crack denoted running from the edge or inside the tray; chip was a piece missing from the edge of the tray; the size was the maximum dimension of the missing portion, not including any associated crack; hole occurred in the middle of a tray; and separated piece was a large piece that was 75% or more detached from the tray.

TABLE 14

Damaged tray rating scale

| | Defects | | | Number |
|---|---|---|---|---|
| Category | Crack size (mm) | Chip size (mm) | Hole size (mm) | Total allowable defects |
| 0 | 0 | 0 | 0 | 0 |
| 1 | ≤10 | ≤5 | 0 | ≤2 |
| 2 | ≤30 | ≤20 | ≤10 | ≤4 |
| 3 | ≤30 | ≤20 | ≤10 | ≤6 |
| 4 | >30 | >20 | >10 | ≤4 |
| 5 | >30 | >20 | >10 | >4, or ≥1 separated piece |

TABLE 15

Drop test results of trays thermoformed from CLOISITE™ 20A sheets and R1 sheet

| Example | $1^{st}$ Drop 1.1 m @ machine direction | $2^{nd}$ Drop 1.3 m @ machine direction | $3^{rd}$ Drop 1.3 m @ Transverse direction |
|---|---|---|---|
| 37 | 3 out of 10 trays failed (small piece fallen off) | 3 more trays failed (2 piece fallen off edge & 1 minor bridge break) | 2 more trays failed (1 bridge break and 1 piece fallen off edge) |
| 38 | All passed | All passed | 1 tray failed (small piece fallen off) |
| 39 | All passed | All passed | All passed |
| 40 | 1 out of 10 trays failed (small piece fallen off) | All passed | All passed |
| 41 | 8 out of 20 trays failed (2x large pieces fallen off edge, 6x small pieces off edge) | 5 more trays failed (4x small piece fallen off edge, 1x large piece fallen off edge) | 2 more trays failed (1x small piece fallen off edge, 1x large piece fallen off edge) |
| 42 | All passed | All passed | All passed |
| 43 | All passed | All passed | All passed |

As shown in Table 15, all trays made from CLOISITE™ 20A sheets had significantly better drop test performance than R1. For R1, 75%-80% trays failed the drop tests, whereas all 2% CLOISITE™ 20A, 3% CLOISITE™ 20A (concrete mix) and 5% CLOISITE™ 20A trays passed the drop test.

Examples 44 to 47

Trial Conducted on Large Production Extruder (ENTEK™ 103)

Examples 44 to 47 demonstrate that trays including CLOISITE™ 20A are clearer and have significantly better drop test performance.

Master batch pellets were ground into powder. The following sheets were extruded:

Example 44-R1

Example 45-R1, 2% CLOISITE™ 20A

Example 46-R1, 2% CLOISITE™ 20A

Example 47-R1, 2% CLOISITE™ 20A

The output rate for each example was 210 kg/h, and the extruder screw speed for each example was 225 rpm.

TABLE 16

Barrel temperatures set on ENTEK™ 103

| Example No. | Barrel Temp (° C.) |
|---|---|
| 44 | 30, 70, 90, 125, 135, 140, 130, 100, 75, 75, 75, 80, 80 |
| 45 | 30, 70, 90, 125, 135, 140, 130, 100, 75, 75, 75, 80, 80 |
| 46 | 30, 70, 90, 125, 135, 140, 130, 100, 75, 75, 75, 80, 80 |
| 47 | 30, 70, 90, 125, 135, 140, 130, 100, 75, 75, 75, 80, 80 |

TABLE 17

Drop test results on ENTEK™ 103 composites (50%·RH and 35%·RH)

| Example number | Roll number | Drop test at 1.2 m 50%·RH | Drop test at 0.9 m at 35%·RH |
|---|---|---|---|
| 44 | 23390 | 1.5 | 4.9 |
| 45 | 23391 | 0 | 2.9 |

TABLE 17-continued

Drop test results on ENTEK™ 103 composites
(50% · RH and 35% · RH)

| Example number | Roll number | Drop test at 1.2 m 50% · RH | Drop test at 0.9 m at 35% · RH |
|---|---|---|---|
| 46 | 23392 | 0 | 4 |
| 47 | 23394 | 0 | 3 |

TABLE 18

Haze results on ENTEK™ 103 composites

| Example number | Roll number | Haze test |
|---|---|---|
| 44 | 23390 | 31.83 |
| 45 | 23391 | 23.67 |
| 46 | 23392 | 23.88 |
| 47 | 23394 | 23.29 |

The haze result in the control was higher than normal due to the presence of Maltese Crosses in the sheet.

Examples 48 to 52

Trial Conducted on Pilot Scale Extruder (ENTEK™ 27)

Examples 48 to 52 demonstrate that trays including CLOISITE™ 20A are clearer and have significantly better drop test performance.

Master batch pellets were ground into powder. The following sheets were extruded:

Example 48-R1
Example 49-R1, 2% CLOISITE™ 20A added as pure CLOISITE™ 20A (not masterbatched)
Example 50-R1, 2% CLOISITE™ 20A added as 50% CLOISITE™ 20A masterbatch
Example 51-R1
Example 52-R1, 2% CLOISITE™ 20A added as 25% CLOISITE™ 20A masterbatch The output rate for each example was 16 kg/h, and the extruder screw speed for each example was 395 rpm.

TABLE 19

Barrel temperatures set on ENTEK™ 27

| Example No. | Barrel Temp (□ C.) |
|---|---|
| 48 | 40, 70, 80, 90, 95, 110, 120, 120, 120, 120, 80, 70 |
| 49 | 40, 70, 80, 90, 95, 110, 120, 120, 120, 120, 80, 70 |
| 50 | 40, 70, 80, 90, 95, 110, 120, 120, 120, 120, 80, 70 |
| 51 | 40, 70, 80, 90, 95, 110, 120, 120, 120, 120, 80, 70 |
| 52 | 40, 70, 80, 90, 95, 110, 120, 120, 120, 120, 80, 70 |

TABLE 20

Drop test results on ENTEK™ 27 composites

| Example number | Sample description | Drop test at 0.9 m 35% · RH |
|---|---|---|
| 48 | 070824-R1 | 3.8 |
| 49 | 070824-2% 20A-pure | 2 |
| 50 | 070824-2% 20A-50% master | 2.1 |
| 51 | 070828-R1-control | 3.5 |
| 52 | 070828-2% 20A-25% masterbatch | 2 |

TABLE 21

Haze results on ENTEK™ 27 composites

| Example number | Roll number | Haze test |
|---|---|---|
| 48 | 070824-R1 | 13.26 |
| 49 | 070824-2% 20A-pure | 8.63 |
| 50 | 070824-2% 20A-50% master | 8.75 |
| 51 | 070828-R1-control | 11.15 |
| 52 | 070828-2% 20A-25% masterbatch | 6.87 |

Examples 53 to 55

TEM Analysis

TEM analysis was used in Examples 53 to 55 to demonstrate the substantial exfoliation achieved when hydrophobic CLOISITE™ 20A or CLOISITE™ 25A is used, and the degree of exfoliation is compared with hydrophilic CLOISITE™ Na. In each case, a concentration of 2% CLOISITE™ was employed, and the specimens were prepared in accordance with the procedure outlined in Examples 44 to 47.

Figure 7:
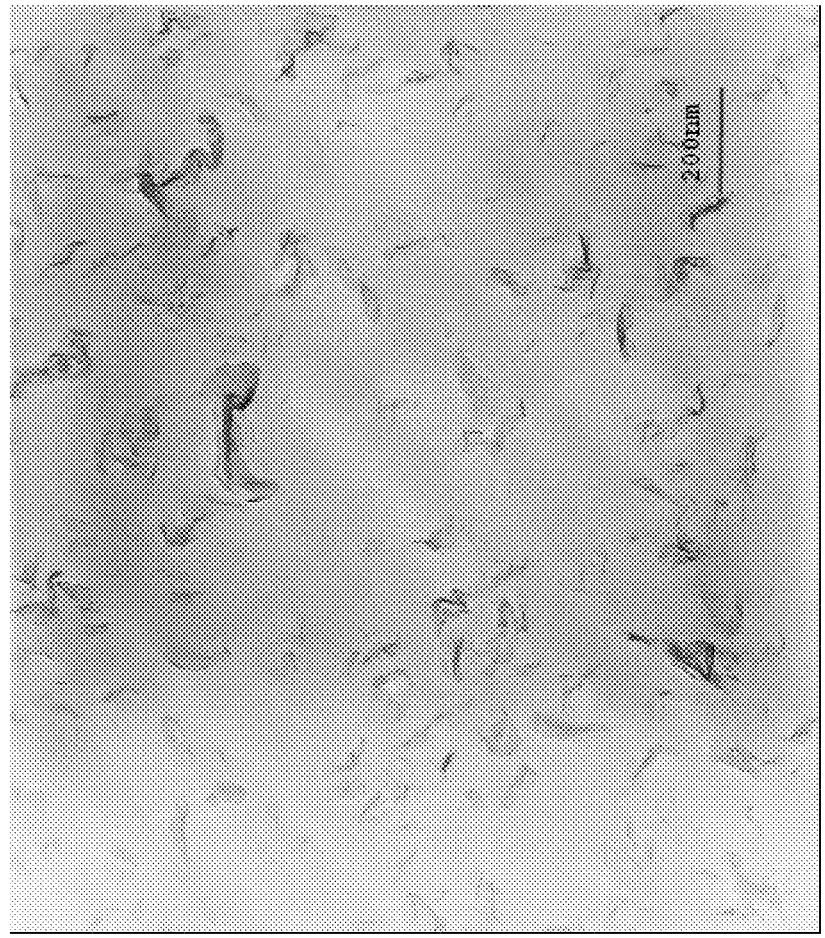
FIG. 7 is a transmission electron microscopy (TEM) micrograph of 2% CLOISITE™ 20A according to Example 53 at 50K magnification.
Figure 8:
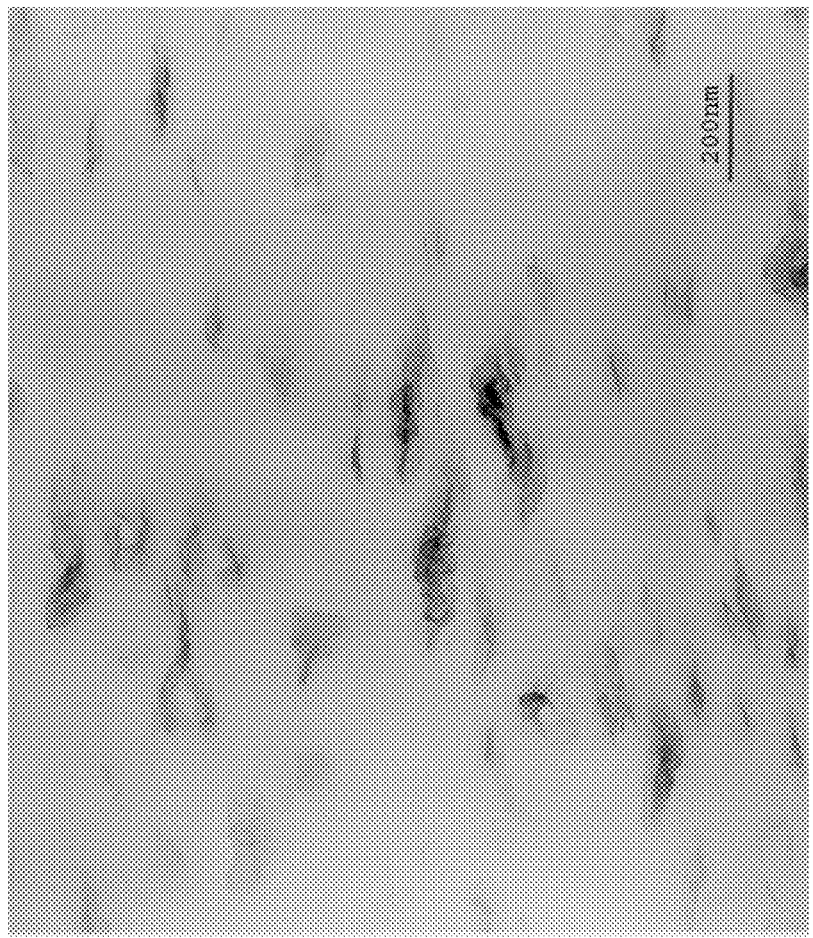
FIG. 8 is a TEM micrograph of 2% CLOISITE™ 25A according to Example 54 at 50K magnification.
Figure 9:
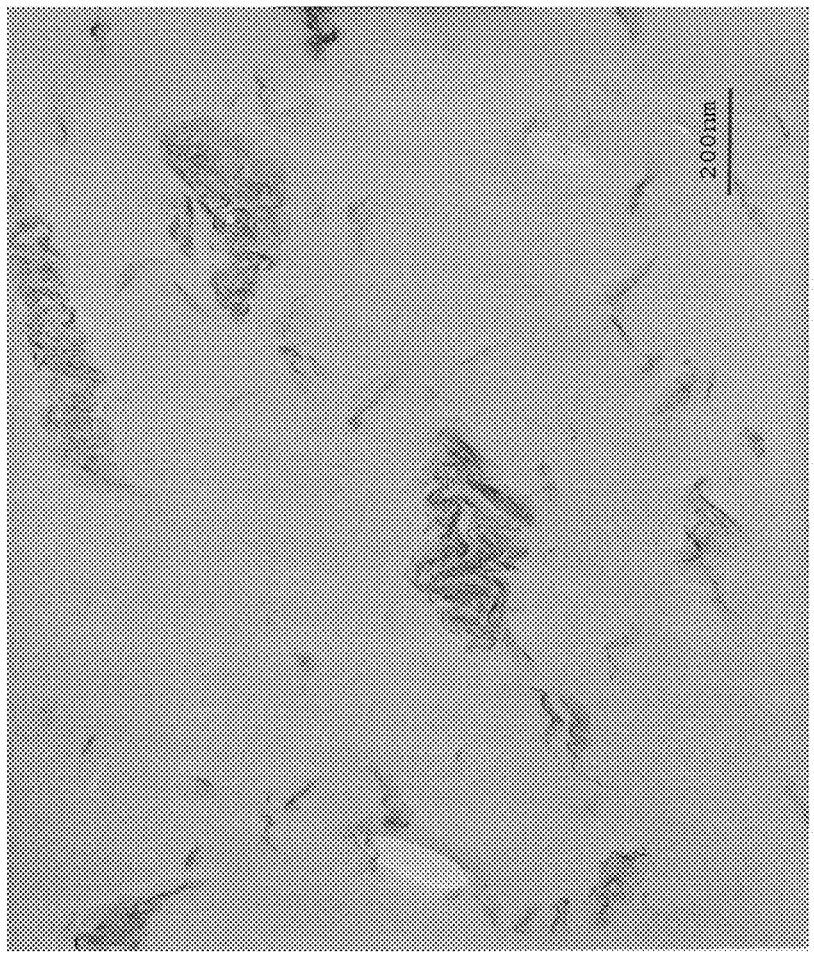
FIG. 9 is a TEM micrograph of 2% CLOISITE™ $Na^+$ according to Example 55 at 50 K magnification.
Figure 10:
FIG. 10 is a TEM micrograph of 2% CLOISITE™ 20A according to Example 53 at 115 K magnification.
Figure 11:
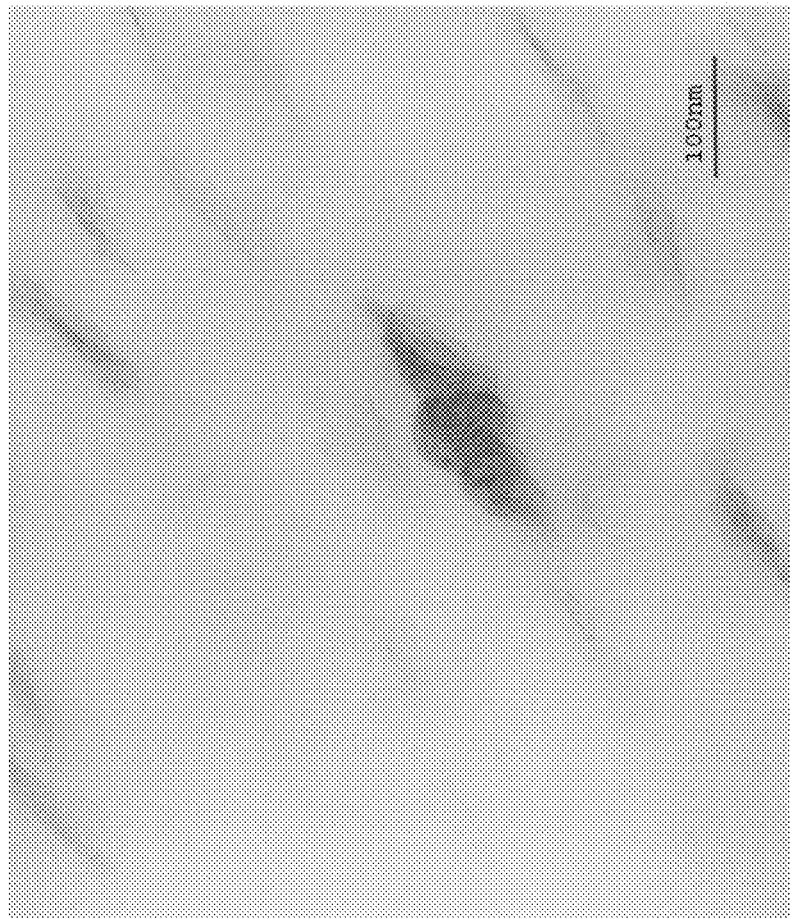
FIG. 11 is a TEM micrograph of 2% CLOISITE™ 25A according to Example 54 at 115 K magnification.
Figure 12:
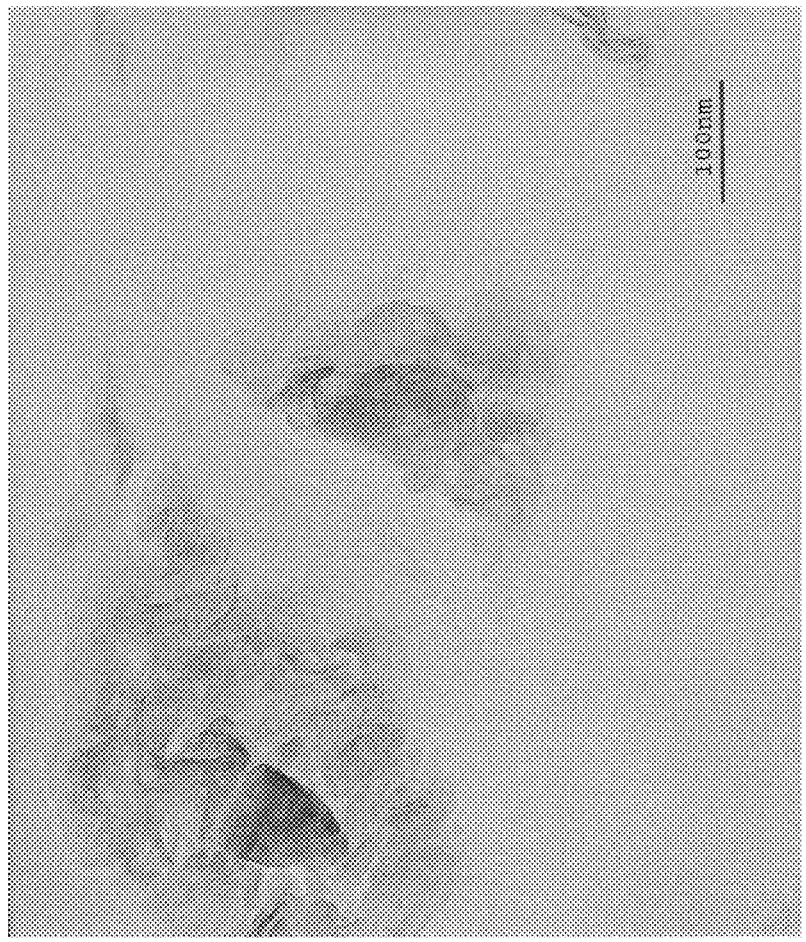
FIG. 12 is a TEM micrograph of 2% CLOISITE™ CLOISITE™ $Na^+$ according to Example 55 at 115 K magnification.

FIGS. 7 and 10 relate to CLOISITE™ 20A, FIGS. 8 and 11 relate to CLOISITE™ 25A, and FIGS. 9 and 12 relate to CLOISITE™ Na. In FIGS. 7, 8 and 9, the magnification is 50 K and the projected area is 2.58 µm². In FIGS. 10, 11 and 12, the magnification is 115 K and the projected area is 0.48 µm².

The TEM images in FIGS. 7, 8 and 9 were analysed as shown in Table 22.

TABLE 22

Analysis of TEM images in FIGS. 7, 8 and 9

Distribution of platelets within specimen:
% (actual number of layers)

| | Singular (1) | Double-Triple (2-3) | Multiple (4-9) Smaller tactoids | Micro-layer (10+) Larger tactoids | Overall number of species |
|---|---|---|---|---|---|
| FIG. 7 | 52 (100) | 26 (51) | 22 (42) | 0 (0) | 193 |
| FIG. 8 | 62 (70) | 19 (22) | 19 (22) | 0 (0) | 114 |
| FIG. 9 | 46 (41) | 28 (25) | 23 (21) | 3 (3) | 90 |

Examples 56 to 60

2% CLOISITE™ 20A Direct Nanocomposite sheets by WAXS

Examples 56 to 61 the WAXS analysis of powdered 2% CLOISITE™ 20A nanocomposite sheets made that were prepared for a 50% masterbatch or by direct addition of clay.

Figure 13:
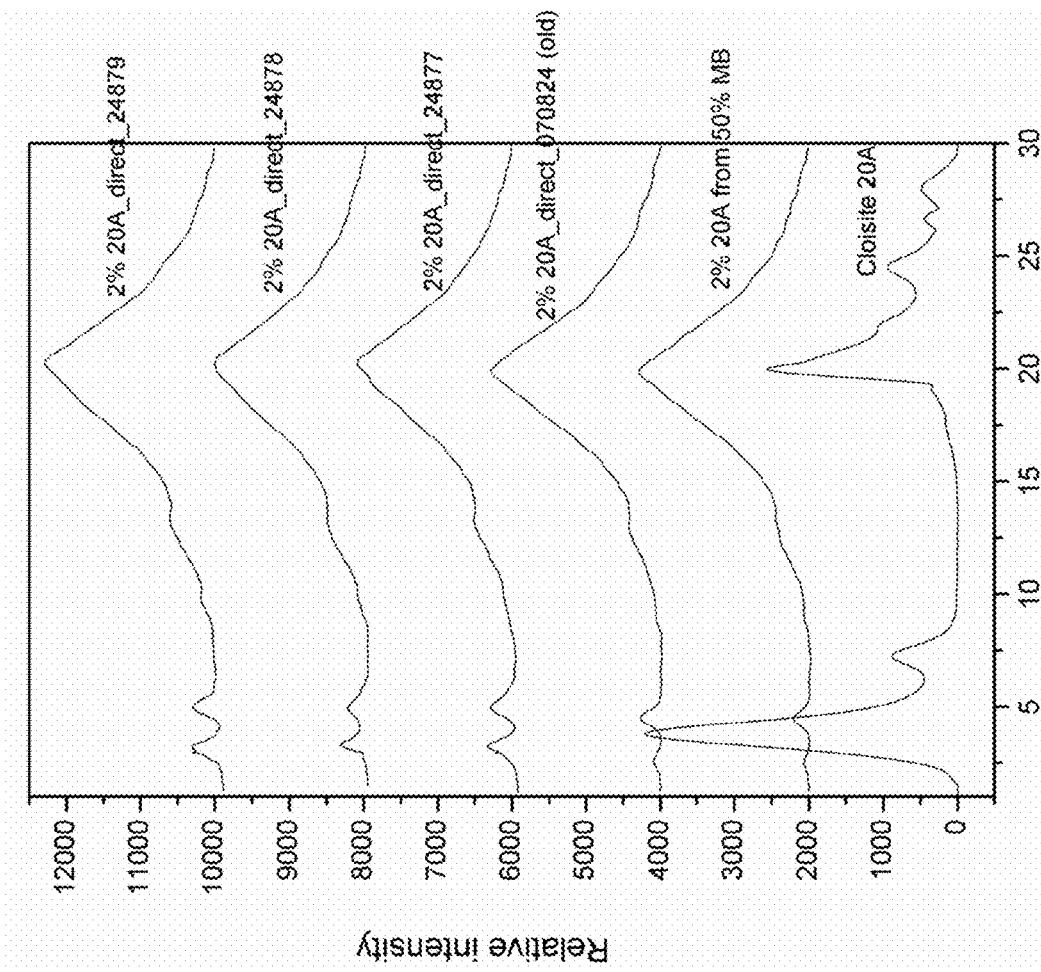
FIG. 13 is WAXS patterns for 2% CLOISITE™ 20A nanocomposites according to Examples 56 to 60.

FIG. 13 shows WAXS pattern of powdered 2% CLOISITE™ 20A nanocomposite sheet prepared from a 50% masterbatch, powdered 2% CLOISITE™ 20A nanocomposite sheet that was prepared by direct addition and CLOISITE™ 20A. An adapted scale is drawn by 2000 units to each curve. Table 16 shows the relevant d-spacing values. All sheets made from direct addition of 2% CLOISITE™ 20A showed expansion of clay platelets due to intercalation of starch between clay platelets in the residual tactoids. The sheet made from 50% CLOISITE™ 20A masterbatch pellets showed greatest expansion of the clay platelets (d-spacing increased from 23.2 Å to 40.5 Å). The 2% 20A CLOISITE™ sheets made by direct addition show a smaller expansion. A possible explanation for the greater expansion observed for the 2% CLOISITE™ 20A from 50% masterbatch nanocomposite may be that this materials has been extruded twice. One in forming the masterbatch and again in forming the nanocomposite sheet. The higher relative crystallinity values (from starch area) were not observed from nanocomposite sheets. However, all nanocomposite sheets show creation of V-type and E-type crystal structures.

TABLE 23

WAXS data of extruded 2% CLOISITE ™ 20A nanocomposite sheets and CLOISITE ™ 20A.

| Example | Composite | d (nm) (2θ°) of unexfoliated clay |
|---|---|---|
| 56 | CLOISITE ™ 20 (A) | 2.35 (3.8°), 1.21 (7.3°) |
| | 2% CLOISITE ™ 20A nanocomposites (FIG. 13) | |
| 57 | 2% 20A_from 50% 20A masterbatch (B) | 4.05 (2.2°) [5.08, 3.54], 1.96 (4.5°) |
| 58 | 2% 20A_direct (C) | 3.74 (2.4°) [5.14, 3.44], 1.96 (4.5°) |
| 59 | 2% 20A_direct (D) | 3.42 (2.6°), 1.97 (4.5°) |
| 60 | 2% 20A_direct (E) | 3.32 (2.7°), 19.2 (4.6°) |

Example 61

10% CLOISITE™ 25A in R1

A procedure for the preparation of nanocomposite sheets based on a 10% CLOISITE™ 25A masterbatch in R1 is exemplified below:

Step 1. A small known amount (approximately 6 g) of CLOISITE 25A masterbatch, to make for a final diluted composition of 1.5%·w/w of CLOISITE 25A, was taken and its moisture content measured at 160° C. for 10 min.

Step 2. Depending upon the moisture content of the CLOISITE 25A masterbatch, known weight of water was added to hydrate a known weight of the masterbatch to a value of approximately 20%·w.w and soaked in a tumbler mixer for 60 min.

Step 3. To the tumbler mixer, known weights of A939 (powder, approximate moisture: 10.5%), PVOH and stearic acid were added to make a final batch weight of 15 kg and mixed for 30 min.

Step 4. The temperature profile used for processing CLOISITE 25A nanocomposites material used was similar to that for CLOISITE 20A.

Step 5. Sheet materials were produced with a thickness of approximately 220-250 μm. These sheets were used to make thermoformed trays (approximately 130° C.).

CONCLUSION

Nanocomposite materials prepared in accordance with the examples exhibited a high degree of exfoliation of the clay, had improved mechanical and rheological properties and reduced sensitivity to moisture. They had improved clarity, remaining transparent for over two months.

CLOISITE™ 20A nanocomposites provide better overall properties compared with CLOISITE™ Na in terms of transparency, with up to 7% improvement. Mechanical properties in machine and transverse directions have better tolerance due to better dispersion and exfoliation of the clay, which indicated better isotropic morphology that will be of benefit in thermoforming processes.

The invention claimed is:

1. A film comprising a substantially exfoliated nanocomposite material, and said nanocomposite material including starch and hydrophobically modified layered silicate clay, wherein said starch has an amylose content of greater than 50%, and said starch comprises a derivatized starch, wherein the film has a transparency that is higher than a film of the nanocomposite material in which the starch has an amylose content of less than 50%, wherein said film is free of polyester polymers, and wherein said film includes one or more water-soluble polymers.

2. The film according to claim 1, wherein the derivatized starch includes esters or ethers.

3. The film according to claim 1, wherein the derivatized starch includes acetylated starch, starch succinate, carboxymethylated starch or hydroxyalkylated starch.

4. The film according to claim 3, wherein the hydroxyalkylated starch is a hydroxypropylated starch.

5. The film according to claim 1, wherein the nanocomposite material comprises between 0.1 and 5% by weight of the hydrophobically modified layered silicate clay.

6. The film according to claim 1, wherein the hydrophobically modified layered silicate clay is clay modified by exchange with a surfactant comprising a $C_{12}$-$C_{22}$ alkyl group.

7. The film according to claim 6, wherein the surfactant comprises a mono- or di-$C_{12}$-$C_{22}$ alkylammonium ion.

8. The film according to claim 7, wherein no polar substituents are attached to an alkyl chain of the mono- or di-$C_{12}$-$C_{22}$ alkylammonium ion.

9. The film according to claim 1, including more than one hydrophobically modified layered silicate clay.

10. The film according to claim 1, wherein the nanocomposite material comprises 5 to 30% by weight of water based on the weight of the nanocomposite material.

11. The film according to claim 1, further including one or more plasticizers.

12. The film according to claim 1, further including one or more processing aids.

* * * * *